(12) United States Patent
Monden et al.

(10) Patent No.: US 6,901,650 B2
(45) Date of Patent: Jun. 7, 2005

(54) ADJUSTING METHOD FOR AN OPTICAL DISC APPARATUS

(75) Inventors: Hideaki Monden, Tokyo (JP); Hironobu Amemiya, Chiba (JP)

(73) Assignee: Sony Computer Entertainment Inc., Tokyo (JP)

( * ) Notice: Subject to any disclaimer, the term of this patent is extended or adjusted under 35 U.S.C. 154(b) by 151 days.

(21) Appl. No.: 10/627,475

(22) Filed: Jul. 25, 2003

(65) Prior Publication Data

US 2004/0017766 A1 Jan. 29, 2004

Related U.S. Application Data

(62) Division of application No. 09/939,530, filed on Aug. 24, 2001, now Pat. No. 6,667,944.

(30) Foreign Application Priority Data

Nov. 21, 2000 (JP) ........................................ 2000-354056

(51) Int. Cl.[7] ........................... G11B 5/127; H04R 31/00
(52) U.S. Cl. ............................... 29/603.03; 29/603.04; 29/903.1; 29/469; 360/99.01; 360/99.02; 360/99.06; 360/99.12; 369/219; 369/247; 369/249; 720/691; 720/695; 720/703
(58) Field of Search ....................... 29/603.03, 603.04, 29/603.1, 469; 360/99.01, 99, 99.06, 99.1; 369/44.21, 75.1, 176, 215, 219, 244, 255, 258, 263; 720/691, 695, 703

(56) References Cited

U.S. PATENT DOCUMENTS

| | | | |
|---|---|---|---|
| 4,996,619 A | | 2/1991 | Negishi et al. |
| 5,107,484 A | * | 4/1992 | Kawamura et al. ......... 720/658 |
| 5,172,361 A | | 12/1992 | Urushibata et al. |
| 5,533,000 A | * | 7/1996 | Koizumi ..................... 720/699 |
| 5,724,337 A | | 3/1998 | Kawano et al. |
| 5,912,786 A | * | 6/1999 | Nicklos et al. .......... 360/99.09 |
| 6,137,765 A | | 10/2000 | Saito et al. |
| 6,301,082 B1 | * | 10/2001 | Sonderegger et al. .... 360/266.2 |
| 6,324,152 B1 | | 11/2001 | Eguchi et al. |

FOREIGN PATENT DOCUMENTS

| | | | | |
|---|---|---|---|---|
| JP | 09320214 A | * | 12/1997 | ........... G11B/21/02 |
| JP | 11-066568 | | 3/1999 | |
| JP | 2000-222754 | | 8/2000 | |

OTHER PUBLICATIONS

"Dual-axis driving and interference forces for high sensitivity objective lens actuator"; Lei Huang; Mali Gong; Weipu Jia Consumer Electronics, IEEE Transactions on 4 , Nov. 2001; pp.: 809–816.*

* cited by examiner

Primary Examiner—Paul D Kim
(74) Attorney, Agent, or Firm—Katten Muchin Zavis Rosenman (57) ABSTRACT

A relative adjustment between an optical disc rotating mechanism and an optical pickup is adjusted by rotating a rotary member against a biasing force of an engaging projection. As the rotary member is rotated, the projection is slid for movement on an inclined surface, changing a relative position between the rotary member and a bottom wall of a subsidiary chassis, causing the subsidiary chassis to have a varied inclination relative to a main chassis. An adjusted condition is maintained by an engaging force between an engaging groove and the engaging projection biased toward the rotary member.

5 Claims, 9 Drawing Sheets

ADJUSTING METHOD FOR AN OPTICAL DISC APPARATUS

CROSS REFERENCE TO RELATED APPLICATION

This is a divisional application of U.S. application er. No. 09/939,530 filed Aug. 24, 2001, now U.S. Pat. No. 6,667,944.

BACKGROUND OF THE INVENTION

1. Field of the Invention

The present invention relates to an optical disc apparatus in which an optical disc is irradiated with a laser beam from an optical pickup, to thereby record and/or reproduce information, and an adjusting method for an optical disc apparatus, and further to an entertainment apparatus including an optical disc apparatus.

2. Description of the Related Art

The optical disc apparatus is provided with an optical disc rotating mechanism and an optical pickup, for recording and/or reproducing optical disc information, such as of a CD (compact disc), DVD (digital versatile disc), CD-ROM (CD read-only memory), DVD-ROM (DVD read-only memory), CD-R (CD-recordable), and DVD-R (DVD-recordable). The optical disc rotating mechanism is adapted for supporting an optical disc, and the optical pick up, for irradiating a signal recording side of the optical disc by a laser beam.

SUMMARY OF THE INVENTION

Generally, the optical disc apparatus requires a laser beam to be normal to a signal recording side of an optical disc.

However, during production, the optical disc is subject to errors such as when molding component parts or assembling parts together, with a resultant error also in respect of a relative position between an optical disc rotating mechanism and an optical pickup, which may cause a laser beam failing to be normal to an optical disc.

For absorbing such production errors to enhance the normality of a laser beam, there is a known method in which an optical disc rotating mechanism is mounted on a main chassis and an optical pickup is mounted on a subsidiary chassis, and in which the main and subsidiary chassis are interconnected in a rotatable manner, allowing for the subsidiary chassis to be adjusted in inclination relative to the main chassis. More specifically, a spring is interposed between the main and subsidiary chassis, and a bolt inserted into the subsidiary chassis is screwed into a threaded hole formed in the main chassis. Then, the bolt is driven tight against resiliency of the spring, so that the subsidiary chassis is adjusted to have an appropriate inclination to the main chassis. After the adjustment, an adhesive is filled between the bolt and the hole, to thereby prevent rotation of the bolt.

However, as using an adhesive, this method inherently involves complicated work. Moreover, for the time to be secured for the adhesive to become solid, it is difficult to reduce the production time, in addition to the difficulty of readjustment after solidification of the adhesive.

The present invention is made with such points in view. It therefore is an object of the present invention to provide an optical disc apparatus, an adjusting method for an optical apparatus, and an entertainment apparatus including an optical disc apparatus, with improved workability in adjustment for enhancement of the normality of a laser beam to an optical disc, as well as in readjustment to be facilitated.

To achieve the object, according to an aspect of the present invention, an optical disc apparatus comprises a main chassis, a rotary member having a plurality of first engagement parts, a subsidiary chassis, an elastic member, a projection, a helical inclined surface, and a second engagement part. An optical disc rotating mechanism is mounted to the main chassis. A rotation axis of the rotary member is held in a fixed position relative to the main chassis, and the plurality of first engagement parts are arrayed on a circular arc about the rotation axis. The subsidiary chassis supports an optical pickup to be slidable for movement, and is rotatably connected to the main chassis. The subsidiary chassis has an operating part disposed between the main chassis and the rotary member. The elastic member is disposed between the main chassis and the subsidiary chassis, and biases the operating part of the subsidiary member toward the rotary member. The projection is provided to one of the operating part of the subsidiary chassis and the rotary member, to project toward the other thereof. The helical inclined surface is provided to the other of the operating part of the subsidiary chassis and the rotary member, receiving a biasing force from the elastic member, to be brought into pressing contact with the projection, and is configured, as the rotary member is rotated, to slidingly contact the projection, changing a position of the operating part relative to the rotary member. The second engagement part is provided to one of the subsidiary chassis and the elastic member, biased toward the rotary member, and configured for engaging with an arbitrary one of the plurality of first engagement parts to prevent rotation of the rotary member.

For enhancement of a normality of a laser beam relative to an optical disc, an adjustment of a relative position between the optical disc rotating mechanism and the optical pickup is performed by rotating the rotary member against a biasing force of the second engagement part. As the rotary member is rotated, the projection is slid to move on the inclined surface, changing a relative position between the rotary member and the operating part of the subsidiary chassis. Because the rotary member is rotatably supported by the main chassis and its rotation axis is held in a fixed position relative to the main chassis, when the relative position between the rotary member and the subsidiary chassis is changed, an inclination of the subsidiary chassis to the main chassis is changed. As a result, the relative position between the optical disc rotating mechanism and the optical pickup is adjusted, and the adjusted condition is maintained by an engaging force between a first engagement part and the second engagement part biased toward the rotary member.

The adjusted condition can be maintained without use of an adhesive, allowing for adjustment workability to be improved, as well as readjustment to be facilitated.

An entertainment apparatus is provided with an optical disc apparatus according to the present invention.

Artisan will fully understand the above and further objects and features of the present invention by reading preferred embodiments of the invention described herein in connection with the accompanying drawings, including features recited in the appended claims, as well as explicit and implicit effects and advantages of the invention, including those to be apparent through implementation of the invention.

DETAILED DESCRIPTION OF THE PREFERRED EMBODIMENTS

Various embodiments of the present invention will be described with reference to the accompanying drawings. It is noted that like parts or elements are designated by like reference characters in the drawings, without redundant description of the parts or elements.

The present invention is applicable to an entertainment apparatus that has a game executing function for executing a video game based on a game program recorded in an optical disc, such as a DVD-ROM or CD-ROM, and an image reproducing function for reproducing information on an image, such as a picture image, recorded in the optical disc.

First Embodiment

Figure 1:
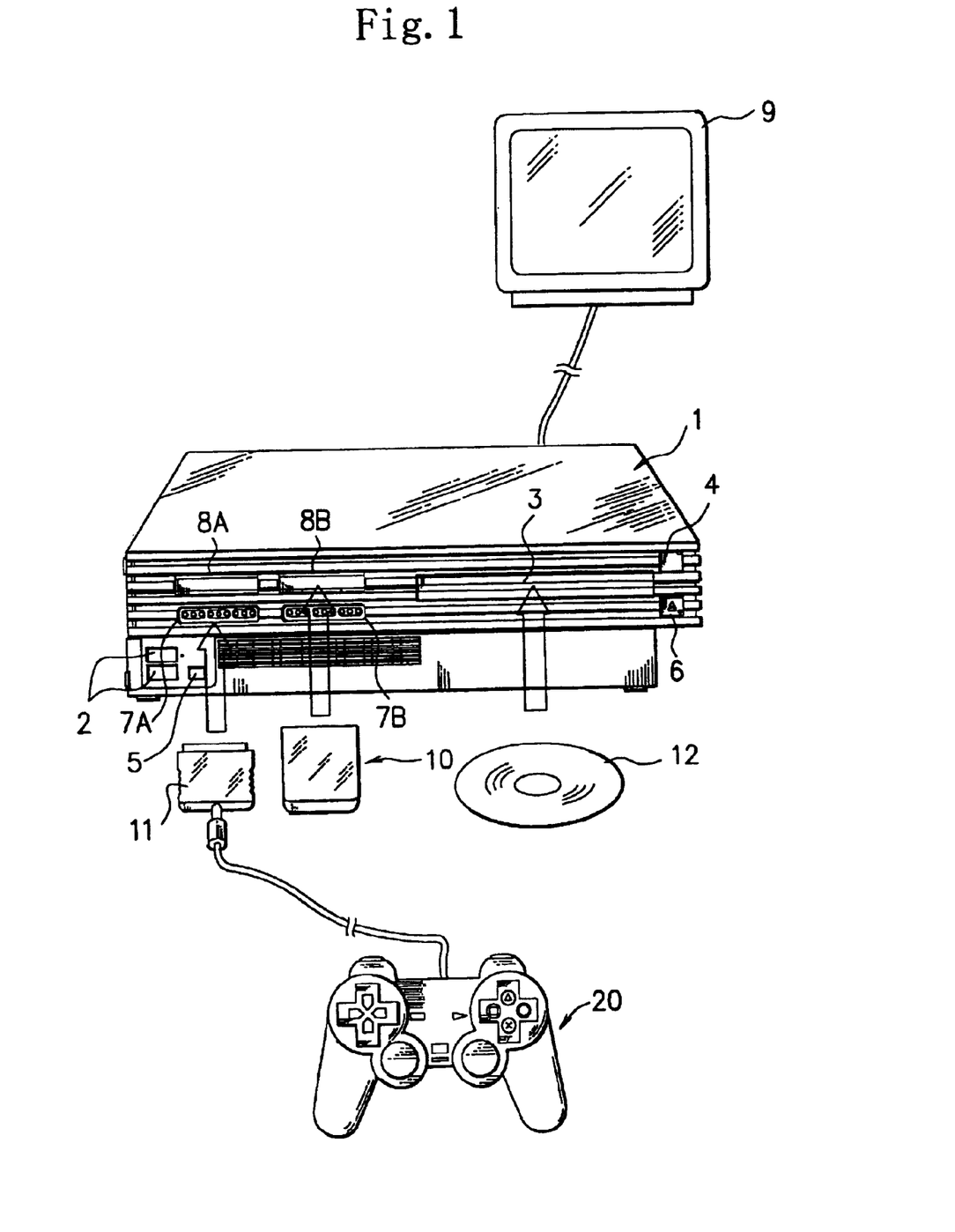
FIG. 1 is a perspective view in appearance of an entertainment apparatus including an optical disc apparatus according to a first embodiment of the present invention.

FIG. 1 shows, in perspective view of appearance, an entertainment apparatus according to a first embodiment of the invention. The entertainment apparatus is equipped with an apparatus body 1 such as for execution of a video game or reproduction of a picture, and a controller 20 connected to the apparatus body 1.

Arrangement of Apparatus Body

The apparatus body 1 has a pair of USB (universal serial bus) connection terminals 2 connectable to USB-oriented apparatuses, an optical disc apparatus 3 of a tray type to which an optical disc 12, such as a CD-ROM or DVD-ROM, having recorded an application program of a television game or multi-medium data such as of a picture can be set, a reset button 4 for resetting a game, an IEEE1394 connection terminal 5 which can cope with a data transfer rate of e.g. 400 Mbps at maximum, a tray operation button 6 for operating a disc tray (not shown) of the optical disc apparatus 3 to go in and out, controller connecting parts 7A and 7B, and memory card application parts 8A and 8B.

The apparatus body 1 is provided at the backside with a power switch (not shown), AV terminals (not shown) for connecting the apparatus body 1 to a monitor 9 or audio device (not shown), and the like.

The controller connecting parts 7A and 7B, two in number, are each respectively connectable to a connector 11 of the controller 20. The memory card application parts 8A and 8B are for application of a saving memory card 10 for game data to be saved (stored) therein and read therefrom, a DVD driver memory card (not shown) in which a driver program for DVD reproduction is stored, and the like.

Arrangement of Optical Disc Apparatus

The optical disc apparatus 3 is provided, as shown in FIG. 2 to FIG. 6, with a main chassis 30, a subsidiary chassis 31, an optical disc rotating mechanism 32 for driving the optical disc 12 into rotation, an optical pickup 33 for reading a signal from the optical disc 12, and a sledding mechanism 34 for moving the optical pickup 33 in a radial direction of the optical disc 12. The optical disc apparatus 3 further has, though not shown, a disc tray for the optical disc 12 to be mounted thereon, a loading mechanism for letting the disc tray go into and out of the apparatus body 1, and a mechanism for moving the optical disc rotating mechanism 32 and the optical pickup 33 toward the disc tray upon loading. It is noted that the optical pickup 33 may be adapted for signal writing and reading to and from the optical disc 12.

Figure 3:
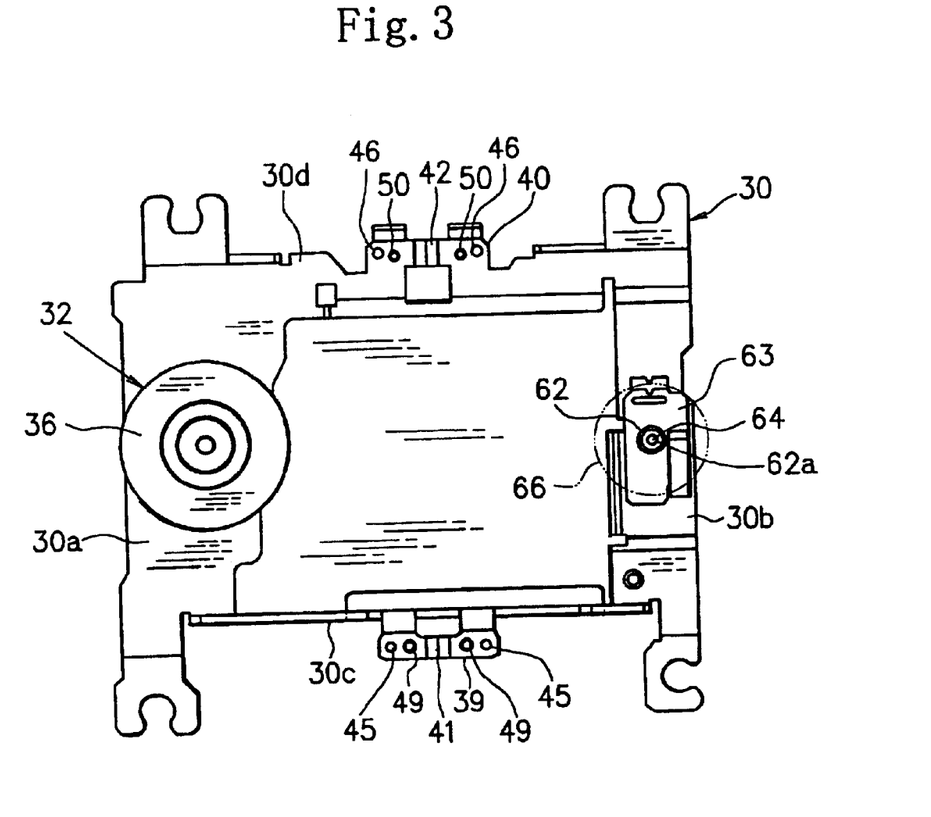
FIG. 3 is a plan view of a main chassis of the optical disc apparatus.
Figure 6:
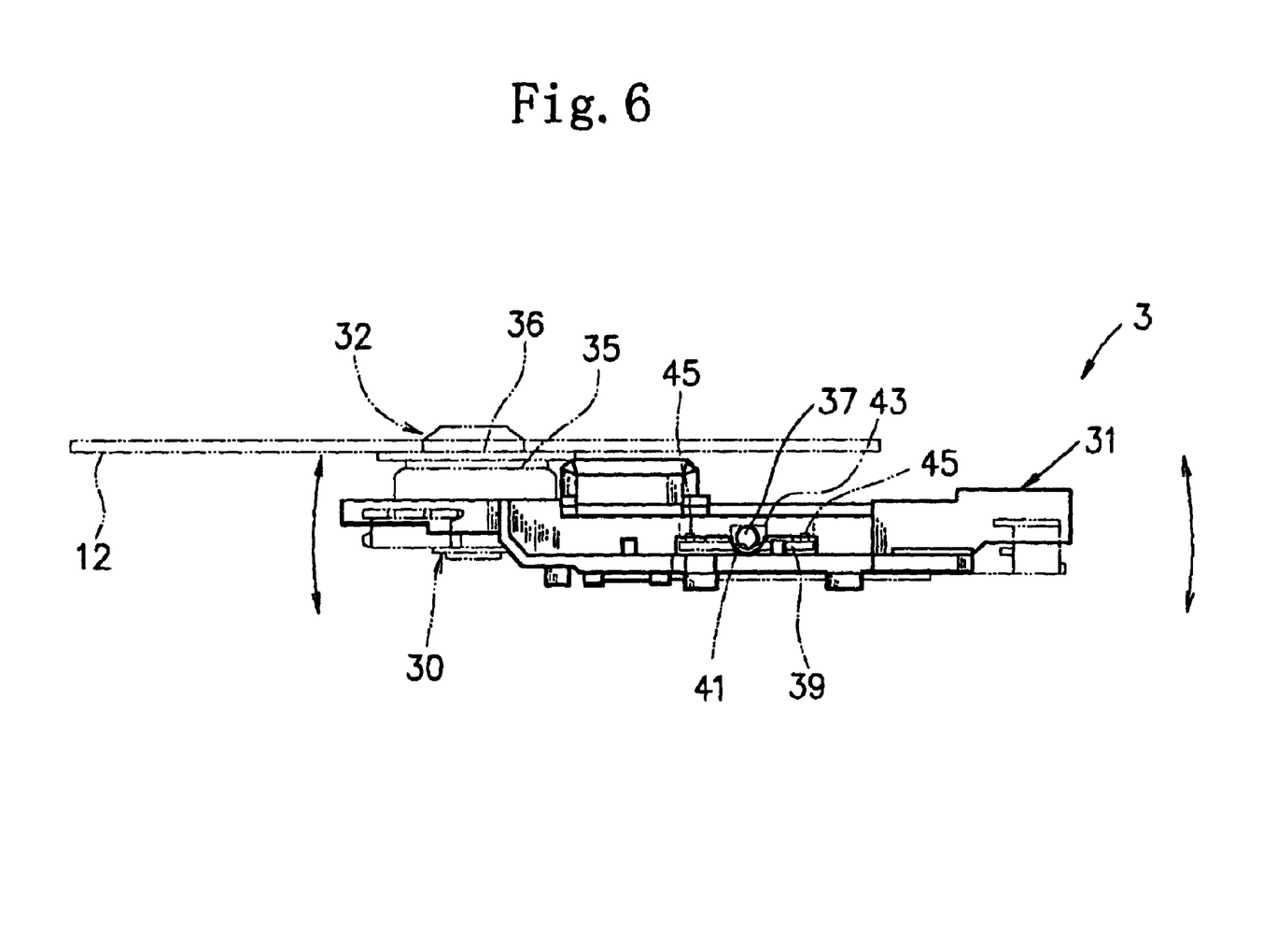
FIG. 6 is a front view of the optical disc apparatus.

As shown in FIG. 3 and FIG. 6, the main chassis 30 is made by a metallic plate punched in a specified form and bent into a frame configuration, which has its one end part 30a and the other end part 30b interconnected by a pair of connecting parts 30c and 30d.

The optical disc rotating mechanism 32 has a spindle motor 34 for rotating the optical disc 12 and a turn table 36 fixed to a spindle shaft (not shown) of the spindle motor 34, and is mounted at the one end part 30a of the main chassis 30.

The two connecting parts 30c and 30d of the main chassis 30 are formed with shaft supporting parts 39 and 40 for rotatably supporting later-described rotation shafts 37 and 38 (shown in FIG. 4 and FIG. 6) of the subsidiary chassis 31. The shaft supporting part 39 is formed with a groove 41 for receiving the rotation shaft 37, projections 45 for positioning a later-described slip-out preventing member 43, and threaded holes 49 for screwing bolts 47 to fix the slip-out preventing member 43. The shaft supporting part 40 is formed with a groove 42 for receiving the rotation shaft 38, holes 46 for positioning a later-described slip-out preventing member 44, and threaded holes 50 for screwing bolts 48 to fix the slip-out preventing member 44.

Figure 4:
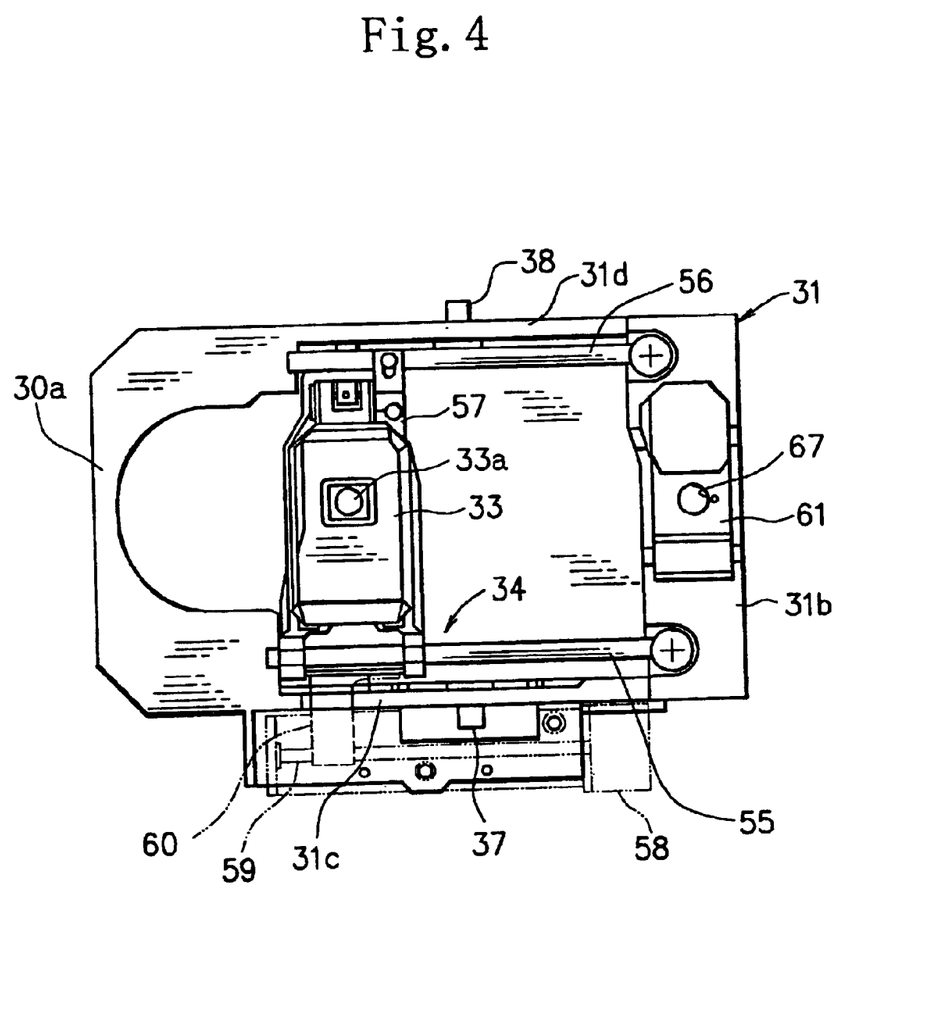
FIG. 4 is a plan view of a subsidiary chassis of the optical disc apparatus.

As shown in FIG. 4, the subsidiary chassis 31 is made by a projection molded hard resin of a frame configuration, which has its one end part 31a and the other end part 31b interconnected by a pair of side walls 31c and 31d.

Figure 2:
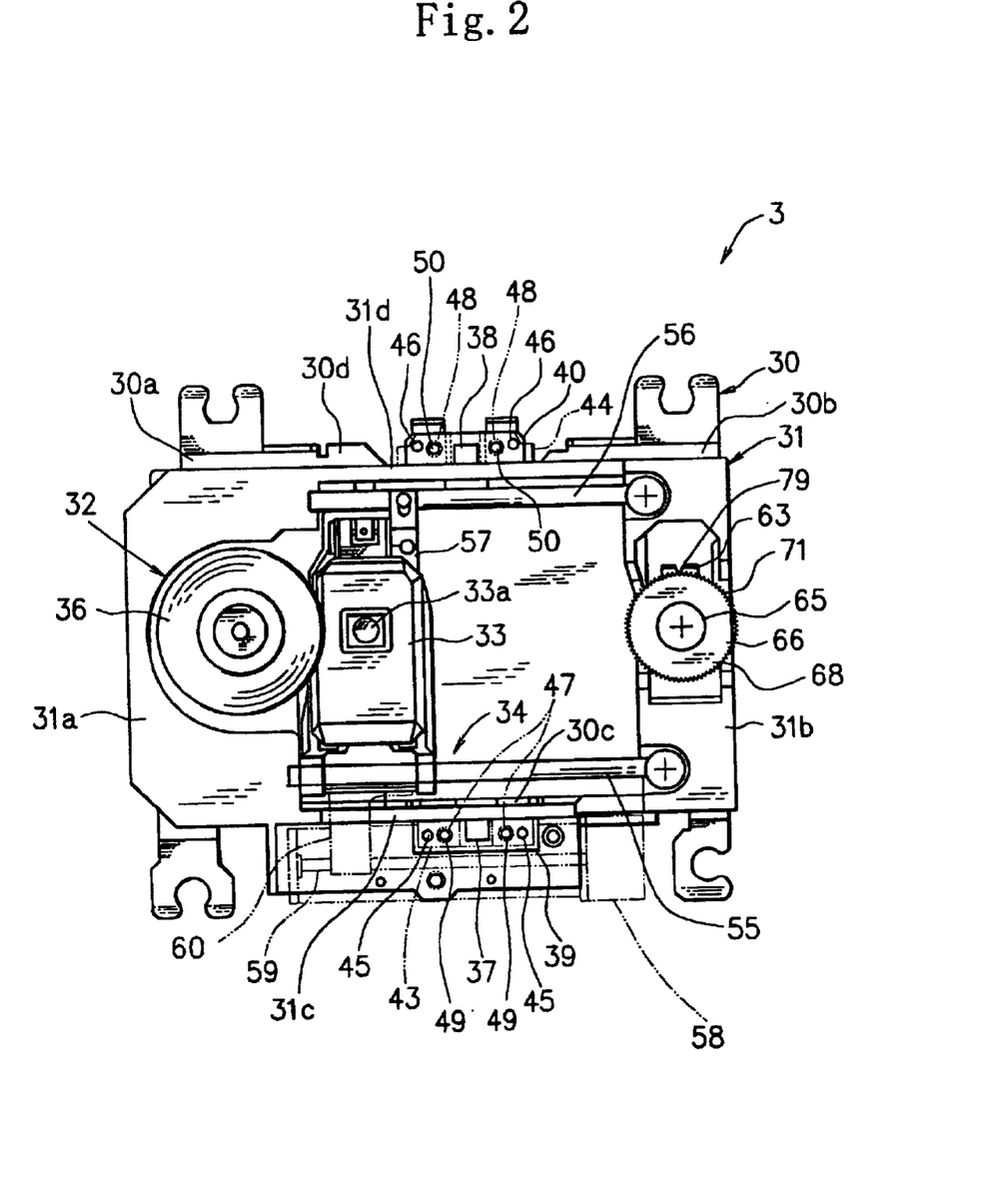
FIG. 2 is a plan view of the optical disc apparatus.
Figure 5:
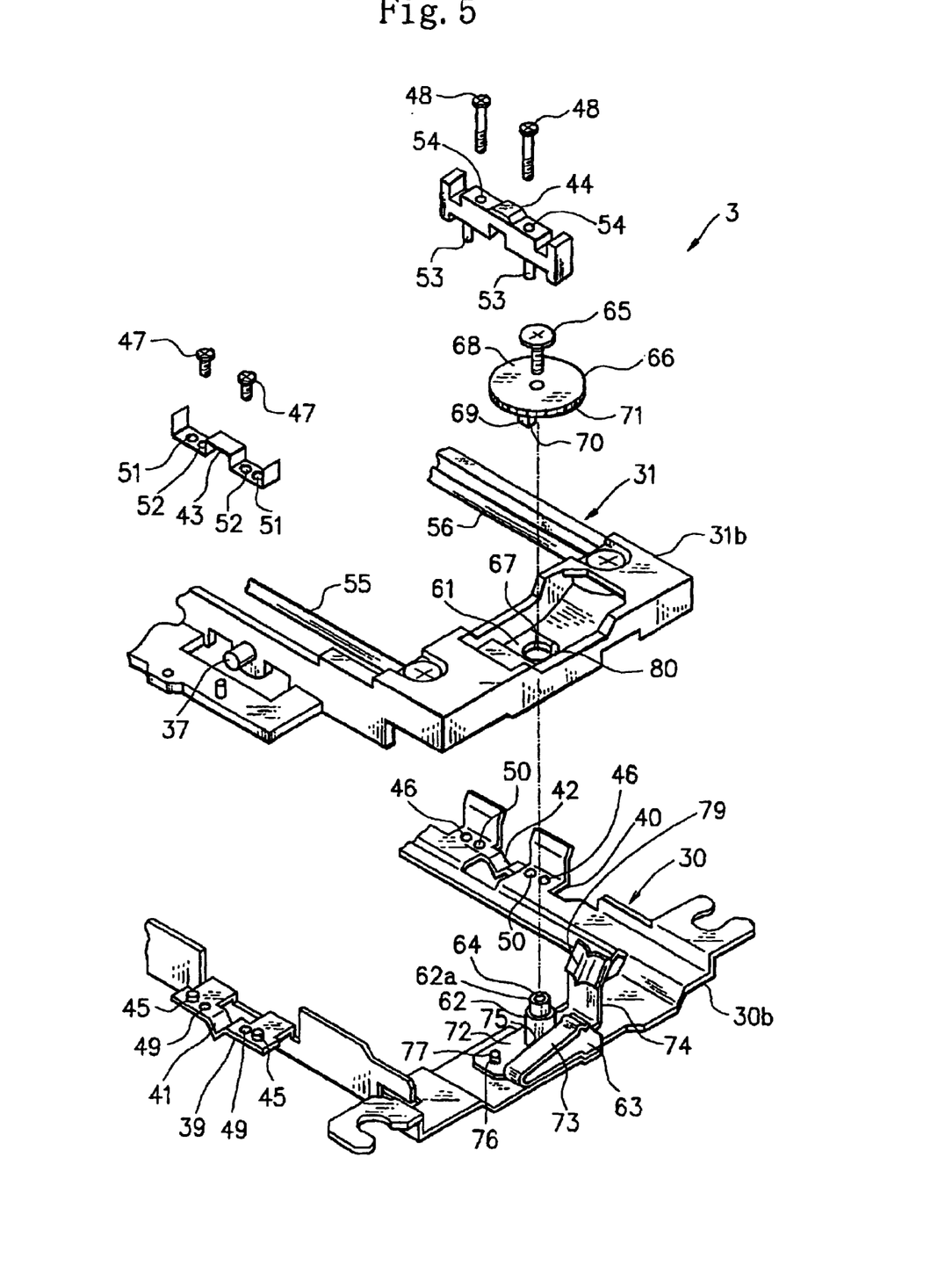
FIG. 5 is an exploded perspective view of the optical disc apparatus.

The rotation shafts 37 and 38 are integrally formed on, as projections from, outsides of the two sidewalls 31c and 31d of the subsidiary chassis 31. As shown in FIG. 2, FIG. 5, and FIG. 6, the rotation shafts 37 and 38 accommodated in the grooves 41 and 42 are rotatably supported between the shaft supporting parts 39 and 40 and the slip-out preventing members 43 and 44. As shown in FIG. 5, one slip-out preventing member 43 has holes 51 for insertion of the projections 45 for positioning the shaft supporting part 39, and holes 52 for insertion of the bolts 47. The other slip-out preventing member 44 has projections 53 to be inserted into the holes 46 for positioning the shaft supporting part 40, and holes 54 for insertion of the bolts 48. The rotation shafts 37 and 38 intersect later-described guide rails 55 and 56 substantially at right angles, and received in the grooves 41 and 42, extending substantially in parallel with a recording side of the optical disc 12.

As shown in FIG. 2 and FIG. 4, the sledding mechanism 34 is provided with a pair of guide rails 55 and 56, a carriage 57, a sled motor 58, a drive rod 59, and a connecting rack 60. The guide rails 55 and 56 are supported at their both ends by the one end part 31a and the other end part 31b of the subsidiary chassis 31. The carriage 57 is supported to be slidable for movement along the guide rails 55 and 56. The optical pickup 33 is mounted on the carriage 57. The guide rails 55 and 56 are configured for restricting the direction of movement of the carriage 57 to cause an objective lens 33a of the optical pickup 33 to move in a radial direction of the optical disc 12. The drive rod 59 has a spiral groove in the outer circumferential surface, and is disposed substantially in parallel with the guide rails 55 and 56, to be direct-coupled to the sled motor 58. The connecting rack 60 is connected at one end thereof to the carriage 57, and engaged at the other end with the groove of the drive rod 59. Rotation of the sled motor 58 is transmitted to the carriage 57 via the drive rod 59 and the connecting rack 60, thereby moving the carriage 57.

As shown in FIG. 5, the other end part 31b of the subsidiary chassis 31 has a bottom wall 61 as an operating part opposing the other end part 30b of the main chassis 30. Between the bottom wall 61 of the subsidiary chassis 31 and the other end part 30b of the main chassis 30 is interposed a plate spring 63 as an elastic or resilient member. A shaft body 62 as a substantially cylindrical metal is fixed to the other end part 30b of the main chassis 30. The shaft body 62 is inserted at the distal end into a hole 67 formed in the bottom wall 61 of the subsidiary chassis 31.

A distal end face 62a of the shaft body 62 is formed with a threaded hole 64, and a bolt 65 screwed to the threaded hole 64 cooperates with the distal end face 62a to have a rotary member 66 rotatably supported therebetween. In other words, a rotation axis of the rotary member 66 is held in a constant or fixed position relative to the main chassis 30, so that the rotary member 66 is rotatably supported in position spaced at a specified distance from the other end part 30b of the main chassis 30 opposing the bottom wall 61.

Figure 7:
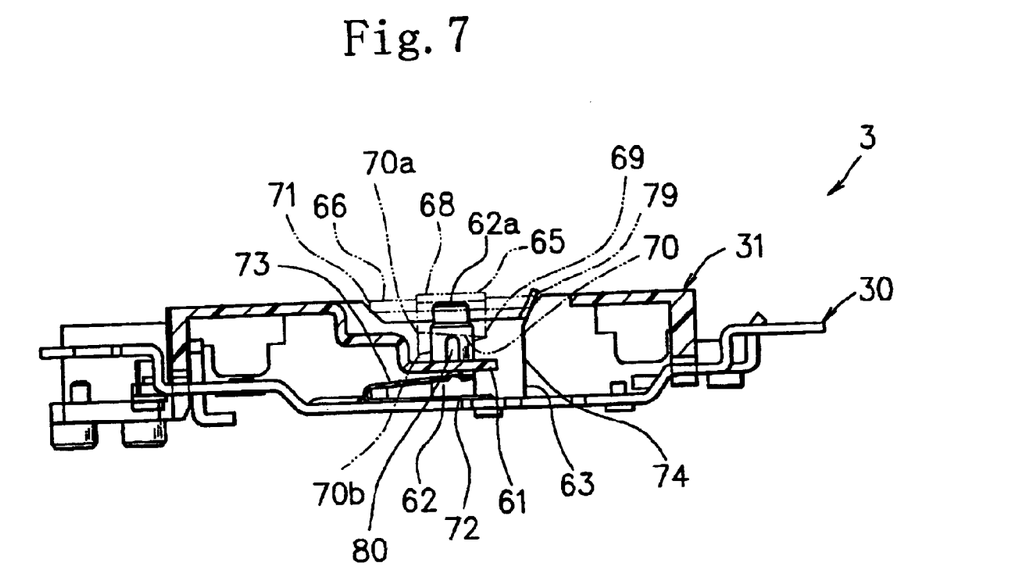
FIG. 7 is a sectional side view of the optical disc apparatus.
Figure 8:
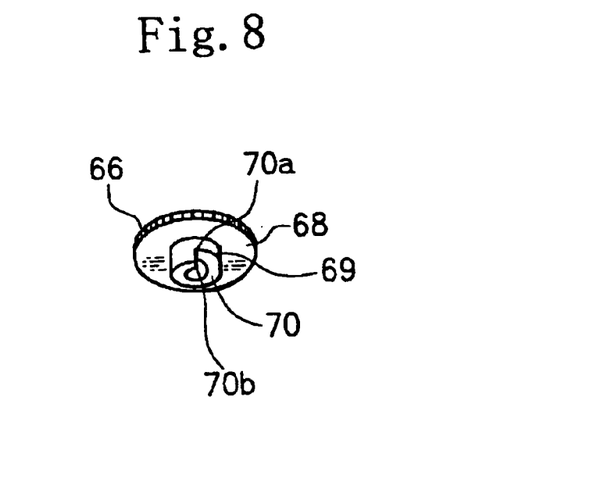
FIG. 8 is a perspective view of a rotary member of the optical disc apparatus.
Figure 9:
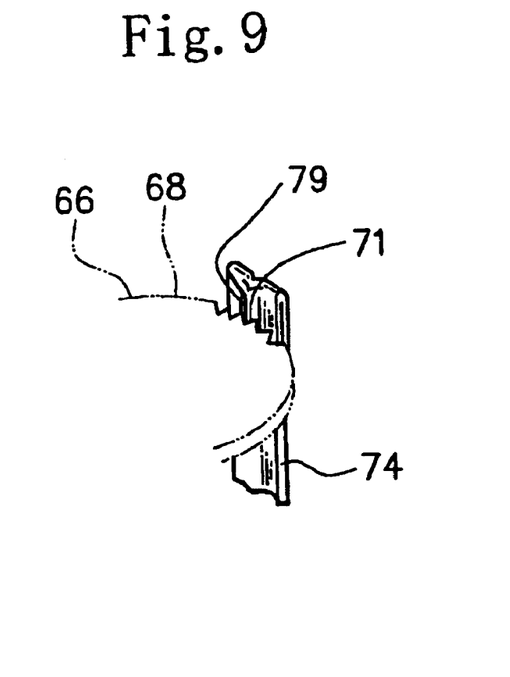
FIG. 9 is a detailed view of an essential portion of the optical disc apparatus, showing engagement between an engaging projection and an engaging groove.

As shown in FIG. 7 and FIG. 8, the rotary member 66 has a substantially annular gear 68 placed on the distal end face 62a of the shaft body 62, and a cam 69 integrally formed on the gear 68 so as to extend therefrom along an outer circumferential surface of a diameter-reduced distal end part of the shaft body 62. The cam 69 is formed with a distal end face constituted as a helical inclined surface 70 spaced at gradually varying distances from the gear 69 (i.e. at gradually varying heights from the other end part 30b of the main chassis 30). The inclined surface 70 is formed substantially within a range of 360°, such that its one end 70a nearest to the gear 68 and the other end 70b farmost from the gear 68 neighbor each other. As shown in FIG. 2 and FIG. 9, the gear 68 has a plurality of engaging grooves 71 consecutively ring-like formed as a first engagement portion in an outer circumferential surface thereof. In other words, the engaging grooves 71 are arrayed on a circular arc about the rotation axis of the rotary member 66. The bottom wall 61 of the subsidiary chassis 31 is interposed between the other end part 30b of the main chassis 30 and the rotary member 66.

The plate spring 63 has a base 72 placed on the other end part 30b of the main chassis 30, a spring piece 73 folded back at one end of the base 72, and an extended part 74 bent at the other end of the base 72 to extend toward the rotary member 66. The base 72 has a hole 75 for insertion of the shaft body 62, and a hole 76 for insertion of a positioning projection 77 projecting from the other end part 30b of the main chassis 30. The plate spring 63 is held in a specified position by inserting the shaft body 62 and the projection 77 into the two holes 75 and 76. As shown in FIG. 7, the spring piece 73 is bent at the distal end so as to project toward the bottom wall 61 of the subsidiary chassis 31, for biasing the bottom wall 61 toward the rotary member 66. As shown in FIG. 9, a distal upper part of the extended part 74 is bent toward the rotary member 66, to be folded back to provide a doubled distal part, and this doubled part is transversely folded in a wavy form with a longitudinally extending transversely central engaging projection 79 as a second engagement part that is lockingly engageable with an arbitrary engaging groove 71 of the rotary member 66. The engaging projection 79 is biased toward the engaging groove 71 by resiliency of the extended part 74, so that locking engagement between the engaging projection 79 and the engaging groove 71 is maintained by a resilient biasing force. It is noted that the rotary member 66 may be formed with a plurality of engaging projections and the plate spring 63 may be formed with an engaging groove lockingly engageable with an arbitrary one of such projections.

The bottom wall 61 of the subsidiary chassis 31 is integrally formed with a projection 80 projecting toward the inclined surface 70 of the rotary member 66. As the bottom wall 61 receives a biasing force from the plate spring 63, the projection 80 is brought into pressing contact on the inclined surface 70. Under such a condition, as the rotary member 66 is rotated, the inclined surface 70 slidingly contacts the projection 80, so that the bottom wall 61 has a changed position relative to the rotary member 66.

Adjusting Method of Optical Disc Apparatus

For enhancement of the normality of a laser beam to the optical disc 12, an adjustment of a relative position between the optical disc rotating mechanism 32 and the optical pickup 33 is performed by rotating the rotary member 66 against a biasing force acting from the extended part 74 of the plate spring 63 on the engaging projection 79. As the rotary member 66 is rotated, the projection 80 is slid for movement on the inclined surface 70, changing a relative position between the rotary member 66 and the bottom wall 61 of the subsidiary chassis 31. Because the rotation axis of the rotary member 66 is held in a fixed position relative to the main chassis 30, as a relative position between the rotary member 66 and the subsidiary chassis 31 changes, the subsidiary chassis 31 has a changed inclination relative to the main chassis 30, allowing for the relative position between the optical disc rotating mechanism 32 and the optical pickup 33 to be adjusted. After the adjustment, the relative position is maintained by an engaging force between the engaging groove 71 of the gear 68 and the engaging projection 79 biased toward the rotary member 66.

Like this, according to the present embodiment, a relative position between the optical disc rotating mechanism 32 and the optical pickup 33 can be maintained with ease without using an adhesive, allowing for adjustment workability to be improved, as well as readjustment to be facilitated.

Moreover, the engaging projection 79 is integrally formed on the plate spring 63, allowing for the number of components to be reduced and the structure to be simplified. Further, the engaging projection 79 is biased toward the engaging groove 71 by resiliency of the plate spring 63, causing a strong engagement therebetween, allowing for a adjusted condition to be maintained firm.

Still more, the inclined surface 70 is formed substantially within a range of 360° such that its one end 70a nearest to the gear 68 and the other end 70b farmost from the gear 68 neighbor each other, and a plurality of engaging grooves 71 are consecutively ring-like formed in an outer circumferential surface of the cam 69, whereby the range of adjustment is widen, allowing for fine adjustment to be coped with.

Second Embodiment

Figure 10:
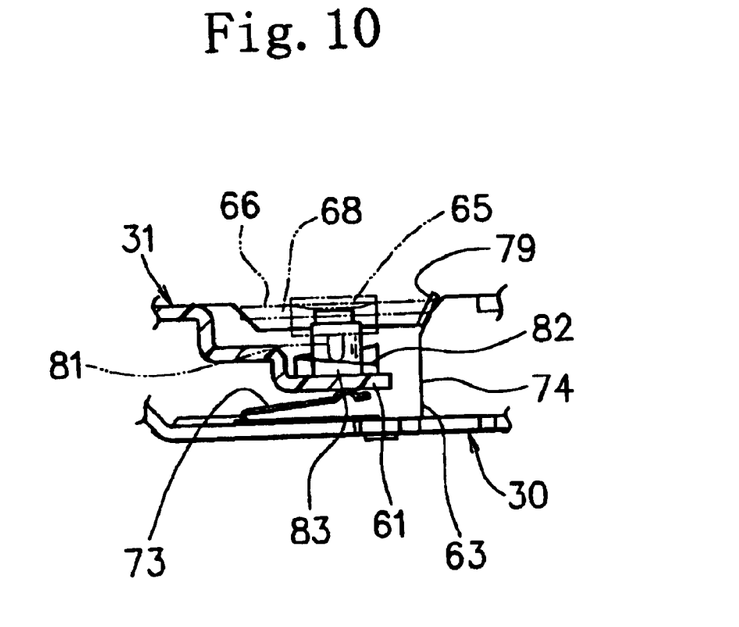
FIG. 10 is a sectional view of an essential portion of an optical disc apparatus according to a second embodiment of the invention.

FIG. 10 shows a second embodiment of the present invention, which is different from the first embodiment in that a projection 81 projects from a gear 68 of a rotary member 66, and a cam 83 is formed with an inclined surface 82 on a bottom wall 61 of a subsidiary chassis 31. Other arrangements of the second embodiment are similar to the first embodiment.

The second embodiment has like effects to the first embodiment.

Third Embodiment

Figure 11:
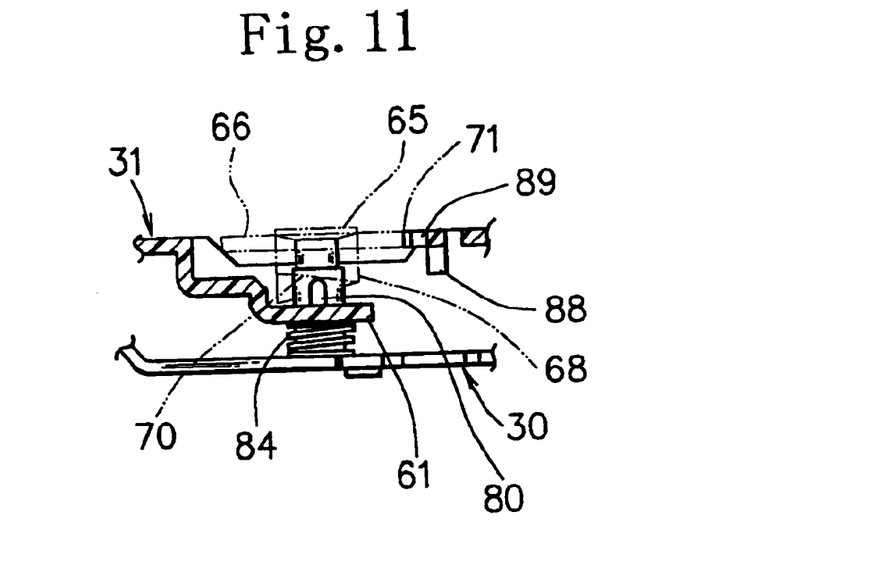
FIG. 11 is a sectional view of an essential portion of an optical disc apparatus according to a third embodiment of the invention.
Figure 12:
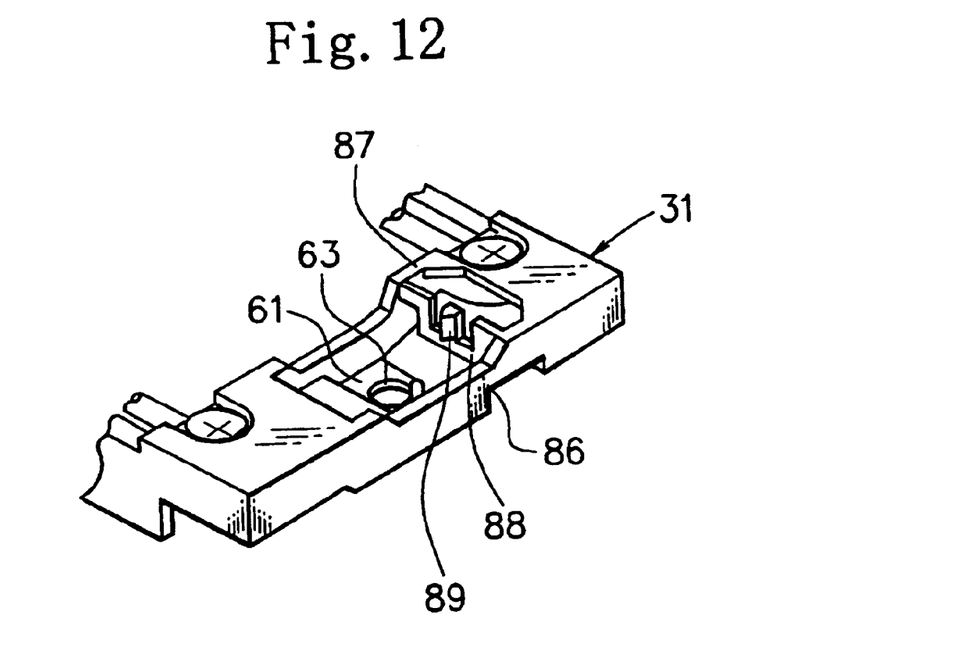
FIG. 12 is a perspective view of an essential portion of a subsidiary chassis of the optical disc apparatus of FIG. 11.

FIG. 11 and FIG. 12 show a third embodiment of the present invention, which is different from the first embodiment in that in place of the plate spring in the first embodiment a coil spring 84 is interposed as an elastic or resilient member between a main chassis 30 and a bottom wall 61 of a subsidiary chassis 31 and in that in place of the engaging projection integrally formed on the plate spring in the first embodiment an engaging projection 89 as a second engagement part is integrally formed on the subsidiary chassis 31. Other arrangements of the third embodiment are similar to the first embodiment.

In the vicinity of an engaging groove 71 of a rotary member 66, there is disposed a connecting part 88 of a substantially U-form integrally connected at both ends thereof to opposite walls 86 and 87 of an end part 31b of he subsidiary chassis 31, while the connecting part 88 has substantially at the center an engaging projection 89 integrally extending therefrom for engagement with the engaging groove 71. The engaging projection 89 is engaged with the engaging groove 71, to be disposed in a slightly flexed position, in a condition biased toward the engaging groove 71.

The third embodiment does not need an adhesive in adjustment work, like the first embodiment, thus allowing for the workability to be improved, as well as readjustment to be facilitated.

It is possible to have a reduced number of components and a simplified structure, with a wide adjustment range, coping with fine adjustment as well.

Provision of the engaging projection 89 independent from a resilient member allows for the resilient member to be designed free from limitations such as to material and configuration.

As will be seen from the foregoing description, according to the present invention, an optical disc apparatus can be maintained in an adjusted condition without use of an adhesive, allowing for the workability to be improved, as well as readjustment to be facilitated.

While preferred embodiments of the present invention have been described using specific terms, such description is for illustrative purposes, and it is to be understood that changes and variations may be made without departing from the spirit or scope of the following claims.

What is claimed is:

1. An adjusting method for an optical disc apparatus, comprising:

mounting an optical disc rotating mechanism to a main chassis;

providing a rotary member having
a rotation axis held in a fixed position relative to the main chassis, and
a plurality of first engagement parts arrayed on a circular arc about the rotation axis;

rotatably connecting a subsidiary chassis to the main chassis, the subsidiary chassis having an operating part disposed between the main chassis and the rotary member;

supporting an optical pickup to be slidable for movement, by the subsidiary chassis;

disposing an elastic member between the main chassis and the subsidiary chassis, the elastic member biasing the operating part of the subsidiary member toward the rotary member;

providing a projection to one of the operating part of the subsidiary chassis and the rotary member, the projection projecting toward the other thereof;

providing a helical inclined surface to the other of the operating part of the subsidiary chassis and the rotary member, the inclined surface receiving a biasing force from the elastic member, to be brought into pressing contact with the projection, the inclined surface being configured, as the rotary member is rotated, to slidingly contact the projection, changing a position of the operating part relative to the rotary member; and providing a second engagement part to one of the subsidiary chassis and the elastic member, biasing the second engagement part toward the rotary member, the second engagement part being configured for engaging with an arbitrary one of the plurality of first engagement parts to prevent rotation of the rotary member;

rotating the rotary member against a biasing force of the second engagement part, so that the projection is relatively slid to move on the inclined surface, changing a relative position between the rotary member and the subsidiary chassis, changing an inclination of the subsidiary chassis relative to the main chassis; and holding the changed inclination by an engaging force between the second engagement part and the arbitrary first engagement part.

2. The adjusting method as claimed in claim 1, further comprising:

forming a hole in the operating part of the subsidiary chassis;

extending a shaft body inserted into the hole, from the main chassis, and supporting the rotary member to be rotatable by the shaft body.

3. The adjusting method as claimed in claim 1, wherein the rotary member has a substantially annular gear and a cam, the plurality of first engagement parts are consecutively ring-like disposed on an outer circumferential surface of the gear, and the cam is integrally extended from the gear to form the inclined surface.

4. The adjusting method as claimed in claim 1, wherein the elastic member comprises a plate spring and the second engagement part is integrally formed with the plate spring.

5. The adjusting method as claimed in claim 1, wherein the second engagement part is integrally formed with the subsidiary chassis.

* * * * *